United States Patent [19]

Hagemeister

[11] Patent Number: 4,512,069
[45] Date of Patent: Apr. 23, 1985

[54] METHOD OF MANUFACTURING HOLLOW FLOW PROFILES

[75] Inventor: Klaus Hagemeister, Ebenhausen, Fed. Rep. of Germany

[73] Assignee: Motoren-und Turbinen-Union Munchen GmbH, Munich, Fed. Rep. of Germany

[21] Appl. No.: 444,200

[22] Filed: Feb. 4, 1983

[51] Int. Cl.³ .................. B21K 3/04; B23P 15/02; B23P 15/04; B21D 53/02
[52] U.S. Cl. .................... 29/156.8 B; 29/156.8 H; 29/156.8 T; 29/157.3 R; 29/157.3 A; 72/256; 72/367; 165/176; 228/174; 228/183; 228/173.2; 228/173.5; 416/96 R; 416/96 A; 416/233
[58] Field of Search ............. 29/156.8 B, 156.8 T, 29/156.8 H, 157.3 A, 157.3 B, 157.3 AH, 157.3 R; 228/173 A, 173 F, 174, 183, 243, 235; 72/256, 367; 416/233, 96 R, 96 A, 208; 165/176

[56] References Cited

U.S. PATENT DOCUMENTS

| 1,177,320 | 3/1916 | Grabowsky | 29/156.8 T |
|---|---|---|---|
| 1,947,347 | 2/1934 | Lorenzen | 29/156.8 B |
| 2,205,893 | 6/1940 | Unger | 72/367 |
| 2,221,548 | 11/1940 | Lampton | 29/156.8 T |
| 2,293,801 | 8/1942 | Caldwell | 29/156.8 T |
| 2,351,425 | 6/1944 | Hanson | 165/176 X |
| 2,418,312 | 4/1947 | Michelman | 228/173 F X |
| 2,522,100 | 9/1950 | Diller | 29/156.8 T |
| 2,759,246 | 8/1956 | Campbell | 29/156.8 H |
| 2,782,862 | 2/1957 | Wright | 416/233 |
| 2,807,870 | 10/1957 | Harness | 416/233 X |
| 2,812,572 | 11/1957 | Altwicker et al. | 29/156.8 T |
| 2,846,758 | 8/1958 | Sejournet | 29/156.8 T |
| 2,998,640 | 9/1961 | Huet | 228/183 X |
| 3,173,196 | 3/1965 | Grimm | 29/157.3 A |
| 3,208,261 | 9/1965 | Pasternak | 29/157.3 B X |
| 3,357,083 | 12/1967 | Wiehn et al. | 228/183 X |
| 3,585,709 | 6/1971 | Muller et al. | 228/183 X |
| 3,623,204 | 11/1971 | Wagle | 29/156.8 B X |
| 3,697,192 | 10/1972 | Hayes | 416/96 R |
| 3,746,525 | 7/1973 | Kasuga et al. | 165/176 X |
| 3,858,290 | 1/1975 | Albani | 29/156.8 T X |
| 4,135,855 | 1/1979 | Peill | 416/96 A X |
| 4,204,309 | 5/1980 | Lefrancois | 29/156.8 H X |
| 4,257,734 | 3/1981 | Guy et al. | 416/96 A X |
| 4,262,516 | 4/1981 | Weber et al. | 72/256 X |
| 4,386,652 | 6/1983 | Dragojevic | 165/176 X |
| 4,413,949 | 11/1983 | Scott | 416/96 A |

FOREIGN PATENT DOCUMENTS

| 0744984 | 2/1956 | United Kingdom | 416/233 |
|---|---|---|---|
| 0364747 | 3/1973 | U.S.S.R. | 416/96 A |

Primary Examiner—Carl E. Hall
Assistant Examiner—Ronald S. Wallace
Attorney, Agent, or Firm—Scully, Scott, Murphy & Presser

[57] ABSTRACT

A method of manufacturing hollow flow profiles having optimum aerodynamic configurations in conformance with a commensurate application, about the respective outer skin of which there flows a first work medium during operation, such as hot gas, whereas ducts which are arranged within the interior of the flow profiles are concurrently streamed through by a second work medium, such as compressed air. The method of the present invention employs suitable deformation techniques (drawing, circular swaging or rolling) at preselected locations to particularly produce web-like aggregations of material. When appropriate materials are used for this purpose, contoured profiles of that type can also be formed through extruding. The webs, depending upon the demands of preceding or successive process steps, can be formed externally, internally or on both sides of the conduit material. The actual deformation for producing the flow profile can then be effected through drawing or rolling, possibly with several intermediate processing steps as required.

4 Claims, 20 Drawing Figures

METHOD OF MANUFACTURING HOLLOW FLOW PROFILES

BACKGROUND OF THE INVENTION

1. Field of the Invention

The present invention relates to a method of manufacturing hollow flow profiles having optimum aerodynamic configurations in conformance with a commensurate application, about the respective outer skin of which there flows a first work medium during operation, such as hot gas, whereas ducts which are arranged within the interior of the flow profiles are concurrently streamed through by a second work medium, such as compressed air.

2. Discussion of the Prior Art

Hollow flow profiles of that type are used, for instance, in heat exchangers, such as are disclosed in German Laid-open Patent Application No. 29 07 810. Provided in these known heat exchangers is a manifold having two separate compressed air ducts. Conducted through one compressed air duct is the incoming compressed air into the lancet-shaped flow profiles, heated therein by the hot gases and then conveyed in a preheated condition into the other compressed-air duct, through which the preheated air is then conveyed to a consumer, such as, for example, the combustion chamber of a gas turbine engine. In the known heat exchangers, the heat exchanger matrix which is formed by the lancet-shaped flow profiles evidences a configuration which laterally projects in a U-shape from the respective manifold.

Moreover, flow profiles of that type can also be employed, for instance, as the stator vanes or rotor blades of a turbomachine, for example, a gas turbine engine, where in the utilization as a turbine, for example, the applicable blades are streamed about by hot gas and, on the other hand, they can be cooled by means of high pressure air bled from the compressor and directed through passageways located interiorly of the blade.

It has always been rather problematic to provide a method which is adapted for the manufacture of flow profiles of that type so that, on the one hand, the produced flow profile will be highly temperature resistant, and on the other, will possess the requisite, in particular steady state strength properties, to sustain steady high fatigue loads. Another requirement for the flow profiles is the provision of a smooth outer wall in order to obviate aerodynamic turbulences.

Experimentally, flow profiles of that type have been drawn from so-called semi-profiles, in which the respective semi-profiles have been joined back-to-back and secured by means of a longitudinal joint through welding or brazing. The difficulties encountered in processes like these are considerable:

the respective semi lancet-shaped profiles are asymmetrical and, consequently, very difficult to produce through drawing, the back-to-back jointing of the semi lancet-shaped profiles causes problems in that gaps or offset edges will occur in the respective outer contour which may produce extensive aerodynamic turbulences, the longitudinal welded or brazed joint resulting from the experimental manufacture of such profiles is continually exposed to the action of hot gas corrosion.

Additionally, in the case of flow profiles which are experimentally manufactured in that manner it is impossible to reshape the ends of such a double profile into a possibly desired circular connection, wherein the profile could be joined, for example, in the previously mentioned heat exchanger, to the central manifold.

SUMMARY OF THE INVENTION

Accordingly, it is a basic object of the present invention, based on the previously considered problems, to provide aerodynamically favorably configured flow profiles or hollow profiled sections in a comparatively simple manner, with these sections being optimally adapted to concurrently sustain high and, conceivably, alternating compressive and thermal stresses with consideration given also to optimum stress design requirements.

In a further aspect of the present invention, the hollow profiled section which is to be manufactured should afford a comparatively lengthy life expectancy with a low susceptibility to corrosion.

In a still further aspect of the present invention, the inventive method of manufacture allows for reworking of partial profiles, in particular the ends of the respective flow profiles so as to provide for the intended connections or joints, without jeopardizing the flow profiles with regard to their already completed basic structure.

An important advantage which is obtained through the inventive process lies in that the demands imposed on the respective flow profiles, particularly regarding aerodynamics, strength and resistance to temperature, are already met at the starting point of the process, wherein the finished product generally requires no additional treatment; thus, when the resultant flow profile is intended for use as a turbine nozzle vane or rotor blade, where the requisite precision forming of the blade, possibly incorporation of blade twist, can still be subsequently completed, as can additional duct connections, for instance, formed at the ends of the profiles, as would be required when use is made of the previously described heat exchanger.

A further essential advantage afforded by the present invention is that the respective conduit is formed as a basically finished product (hollow profile section) also with regard to its internal structure, due to the material distribution aggregate and conformation obtained at the starting point of the process, as well as during the further deforming process, and that it possesses suitably separated ducts for the subsequent flow of compressed air which is to be heated during the heat exchanging process (heat exchanger) or the flow of cooling air (nozzle vane or rotor blade).

Commencing with a conduit which can be of circular or rectangular section, the method of the present invention employs suitable deformation techniques (drawing, circular swaging or rolling) at preselected locations to particularly produce web-like aggregations of material. When appropriate materials are used for this purpose, contoured profiles of that type can also be formed through extruding. The webs, depending upon the demands of preceding or successive process steps, can be formed externally, internally or on both sides of the conduit material. The actual deformation for producing the flow profile can then be effected through drawing or rolling, possibly with several intermediate processing steps as required. The webs formed for these purposes provide the aggregation of material needed at the various locations, such as at the leading and trailing edges and at the intermediate webs of the hollow profile section. Finish forming can also be achieved in several operating steps, and by using an internal tool as may be required. Final forming of the respective profile can be by compressing and welding the respective internal webs, for example, under the rollers of a roll seam welding machine. The thereby formed profiles can, moreover, be manufactured in any suitable length. The previously mentioned webs, which interiorly of the profile already partially provide the ducts or separate these from each other, can serve for steady state functions, for relief of the forces resulting from the pressure of the internal flowing medium, as well as functioning for improving the heat transfer.

In order to improve the heat transfer, if needed, there can be inserted metal strips of turbulence-inducing contours through the interior length of the profile before the webs are welded and brazed together, and can then be secured in place between the webs as part of the structure during the welding or brazing.

In order to manufacture twisted flow sections, for instance, for turbine nozzle vanes or rotor blades, the various airfoils are first cut to length and then forged into the respective final configuration.

With regard to the "several process steps" as mentioned above, it must be mentioned that these become necessary when the degree of deformation must be limited for reasons in the properties of the specific material (cold working) and, for example, there are required intermediate heat treatments. In this respect, for instance, limited ductility of the material during deformation must be considered, so that the final shape must be reached through several intermediate shapes. Particularly with finished shapes which extensively deviate from the circular shape it may, for example, additionally be necessary to limit localized hoop stresses (for instance, with small contour radii and edges), and to achieve the final shape through various intermediate shapes so as to maintain tool wear within reasonable bounds.

In order to connect the flow profiles to other structural components, such as heat exchanger conduits to the respective bottoms of the manifold and distributor conduits, it may be desirable to impart a circular shape to the ends of the flow profiles. With the present process, these circular connecting ends can be formed through an intermediate process step, as follows:

Before the intermediate webs of the profile are welded together, the end portions of the profiled conduit—when the conduit is also in an intermediate condition—are imparted a circular shape through swaging or other process. During the process, the outer shell of the resultant circular conduit section can be provided with toroidal or helical grooves to improve the flexibility, if necessary, of these connecting portions. In lieu of these circular connections, or in addition thereto, the outer shells of the connecting ends can be imparted circumferentially shaped patterns which are particularly adapted to conform to the specific application, by using suitable forming processes. The shaped patterns may be, for example, square, ractangular, trapezoidal, and also hexagonal or octagonal.

Following the operation for producing these end profiles, the webs of the profile can be welded or brazed together in that manner—in this case, however, only partially in the region of the length of the profile which is not affected by the forming process of the ends.

BRIEF DESCRIPTION OF THE DRAWINGS

The invention is now described in detail, taken in conjunction with the accompanying drawings; in which:

FIG. 16 is a perspective view of a heat exchanger for application of the flow profiles produced in accordance with the present invention.

DETAILED DESCRIPTION

Figure 1:
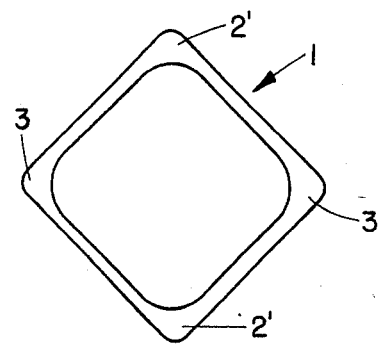
FIGS. 1, 2 and 3 illustrate, respectively, a square and two essentially circular conduit sections.
Figure 2:
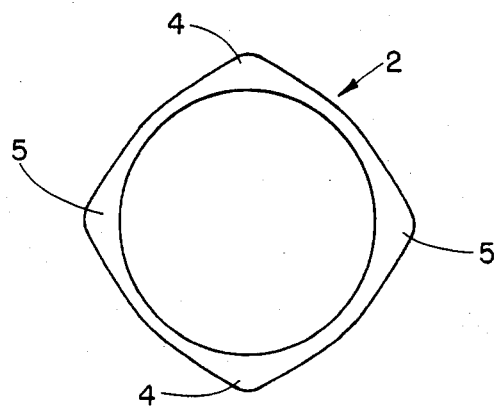

The method of the present invention is now described more fully hereinbelow, as follows:

The method of the present invention, for example, commences from square conduit 1 as shown in FIG. 1, or from an essentially circular conduit 2 as in FIG. 2, wherein through a treating method which is to be described more fully hereinbelow, at the conduit 1 of FIG. 1 is provided with accumulations or aggregates of material, preferably in the respective corners 2', 3, while in the case of FIG. 2 the method commences on an internally cylindrical conduit section on which accumulations of material 4, 5 are circumferentially approximately equally spaced such that the respective conduit 2 is nearly square on its outer circumference, with respective, diametrically oppositely radiused corners.

Figure 3:
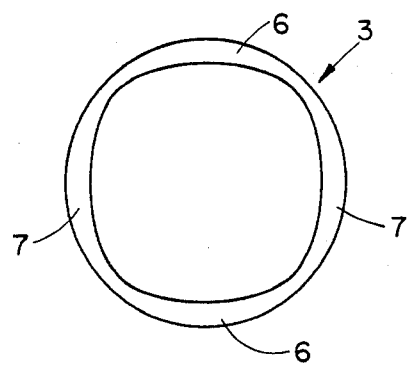

FIG. 3 illustrates an embodiment in which the conduit 3 assumes a cylindrical form at the outer circumference thereof, while the inner circumference of conduit 3 is formed by a varying square and circular inner wall structure.

Figure 6:
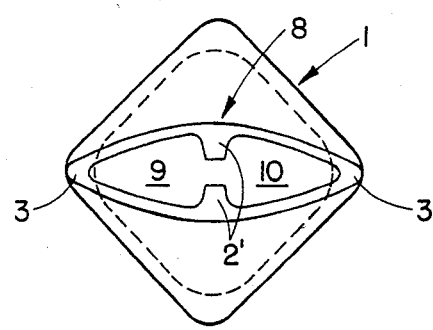
FIG. 6 illustrates the essentially square conduit section of FIG. 1 and, related thereto, a hollow profile shape which is manufactured therefrom.

After a somewhat square conduit 1, as shown in FIG. 1, has been provided with the respective accumulations of material 2', 3, the conduit 1 is deformed as illustrated in FIG. 6 by drawing and rolling whereby the one accumulation of material 3 will form the upstream and downstream thickened walls in the area of the leading and trailing edges of the flow profile 8, while the other accumulation of material 2' will form separating webs between the passages 9, 10 of the flow profile, which are to be completed subsequently. As has been mentioned previously, the arrangement and configuration of the separating webs is of significance primarily for the stress design and for optimization of the heat transfer pattern. It will become apparent from FIG. 6 that the flow profile 8 is basically finished in its shape; however, a gap still remains between the adjacent ends of the separating webs 2, with this gap to be bridged completely by lightly compressing the flow profile in a further operation and then welding the web ends together.

Figure 4:
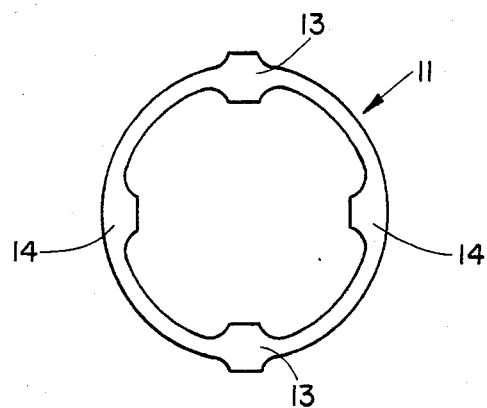
FIGS. 4 and 5, respectively illustrate circular conduit sections, in which the material accumulations are already assuming a web-like shape.
Figure 5:
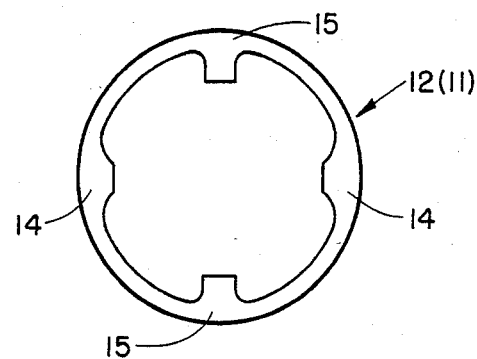

FIGS. 4 and 5 illustrate, through the essentially cylindrical conduit profiles 11 and 12, the respective presence of material accumulations 13 and 14, which here already assume the approximate shape of webs, and wherein the web-like accumulations of material 13 of FIG. 4 not only project beyond the inner circumference of the conduit section 11, but also beyond the outer circumference of the wall. The embodiment of FIG. 5 differs from that of FIG. 4 in that the respective web-like material accumulations 14 and 15, merely project beyond the inner wall circumference of the conduit section 12. These accumulations of material, and to some extent also the conduit sections on which they are formed, can be produced through drawing, circular swaging, rolling or extruding.

Accordingly, FIGS. 4 and 5 can each be used as a separate starting point for the further forming of a respective hollow body or flow profile.

However, FIGS. 4 and 5 can also be assumed as representing two successive process phases; wherein the relatively large amount of material needed to subsequently produce the intended inner or separating webs is provided, for example, by first suitably forming the accumulation of material 13 projecting beyond the inner and outer walls of the conduit section 11 (FIG. 4). In a subsequent processing operation, this material accumulation 13 is then formed into contour 15 (conduit section 11—FIG. 5), after which there is finally effected the additional or finishing contour forming operation.

Figures 7, 9:
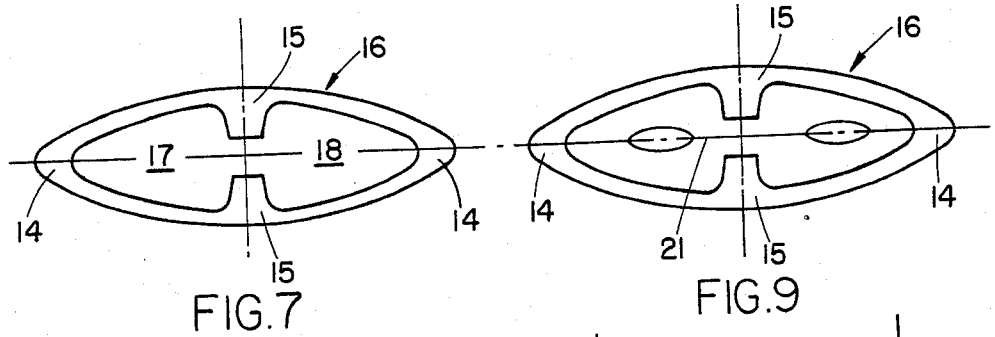
FIGS. 7 and 9 illustrate flow profiles derived and manufactured from the basic conduit section of FIG. 5; however, during an intermediate phase in which the forming process has been interrupted.

The forming of the embodiments of FIGS. 7 and 9 commences with the respective conduit section 12 of FIG. 5, which has respective material accumulations 14 and 15 projecting only beyond the circumference of the inner wall. In accordance with FIG. 7, the flow profile 16 is almost complete, with the respective adjoining web ends of the material accumulation 15 not yet touching. Herein, it is assumed that, for example, the process of forming the conduit contour 12 with the method of the present invention has been interrupted between the configurations of FIGS. 5 and 7 in order to insert an internal tool corresponding to the desired inner contour 17, 18 (FIG. 7) of the passage, after which there is carried out the further forming process to produce the contour 16 (FIG. 7). The internal tool having first been removed, the contour 16 is formed transversely by means of open dies 19, 20 in accordance with FIG. 8 so as to produce the final contour 16', where the web ends are then welded or brazed together shortly before they touch.

Figures 8, 10:
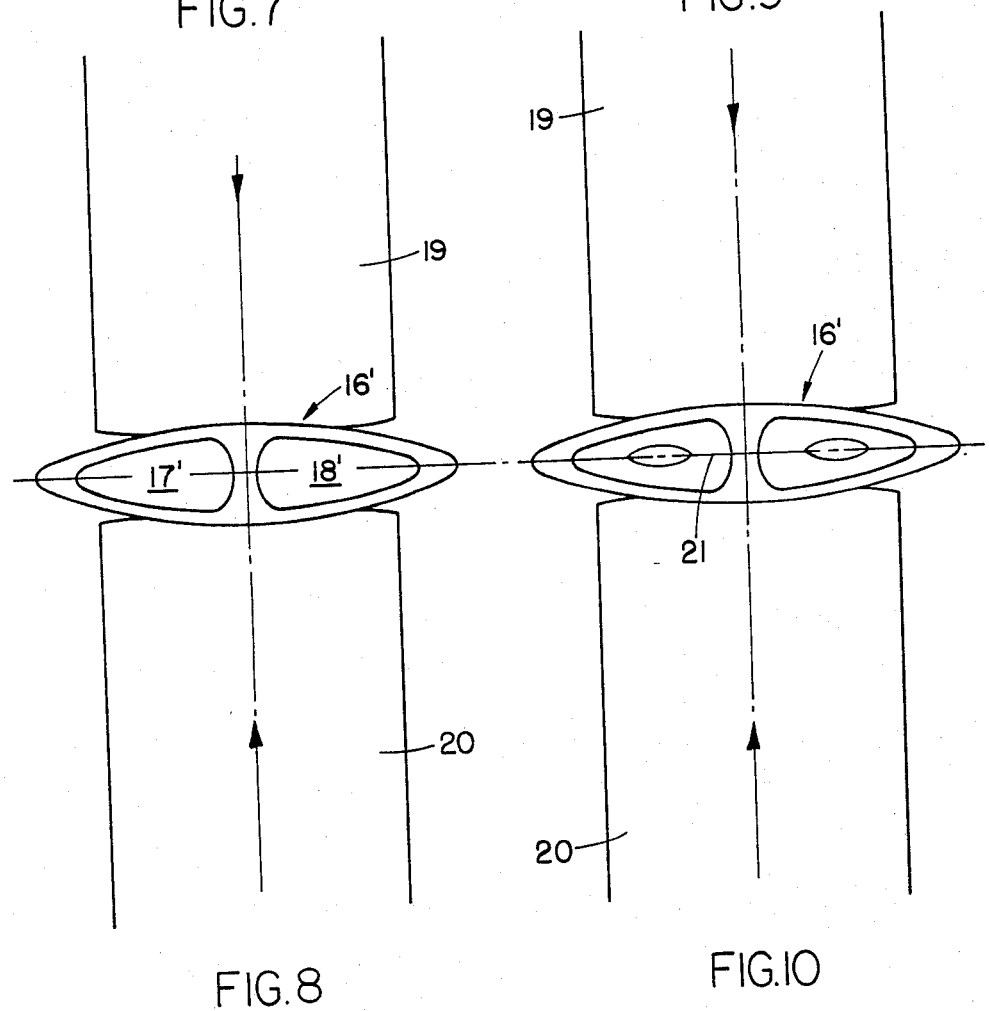
FIGS. 8 and 10 illustrate the respective final configuration of the flow profiles of FIGS. 7 and 9 and, related thereto, the pressing tools required for their final forming, wherein in FIGS. 9 and 10 there is shown the installation of additional turbulence baffles.

FIG. 9 illustrates a flow profile 16 which is also derived from FIG. 5 in the intermediate forming stage of FIG. 7, in which turbulence baffles 21 are inserted before the finishing pressing operation of FIG. 10 into the respective passage gaps and between the contiguous ends of the webs which are formed by material accumulations 15; with these baffles concurrently forming an internal structural component, at the final forming operation as in FIG. 10, of the respective flow profile 16', and are then welded or brazed into place between the web abutment faces so as to form a part of the flow profile.

In a suitable manner, not shown in the drawings, the finishing forming operation on the flow profiles can be performed by concurrently compressing and welding together the inner webs by means of the rollers of a roll seam welding machine.

Figures 11, 13:
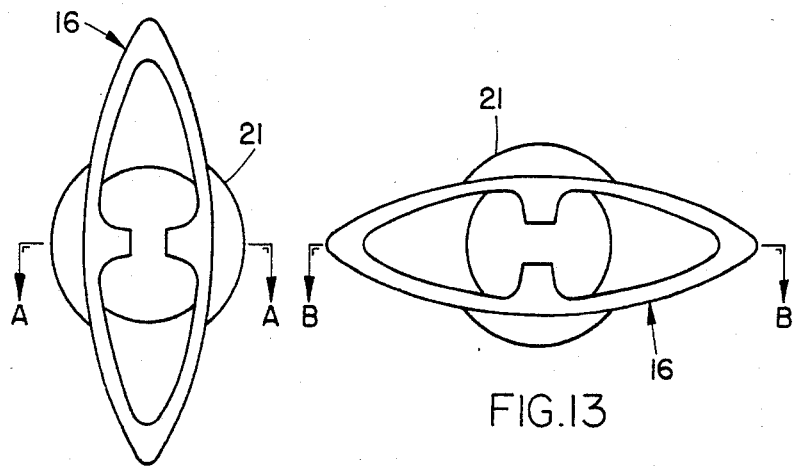
FIGS. 11 and 13 illustrate the same flow profile in various positions and, related thereto, the longitudinal profiled sections (FIGS. 12 and 14) derived from the respective sectional views taken at line A—A (FIG. 11) and line B—B (FIG. 13), wherein the circular connections formed additionally on the flow profiles will become apparent from FIGS. 12 and 14.
Figure 12:
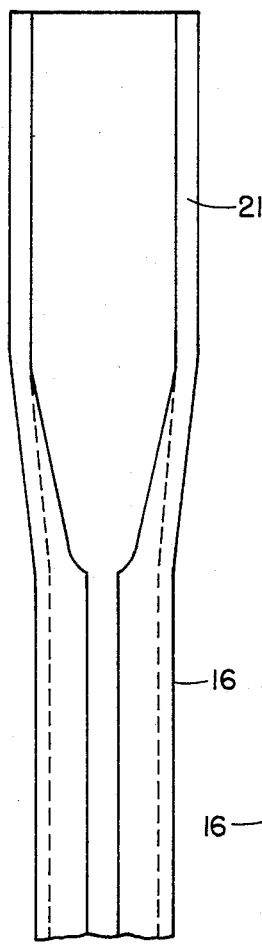
Figure 14:
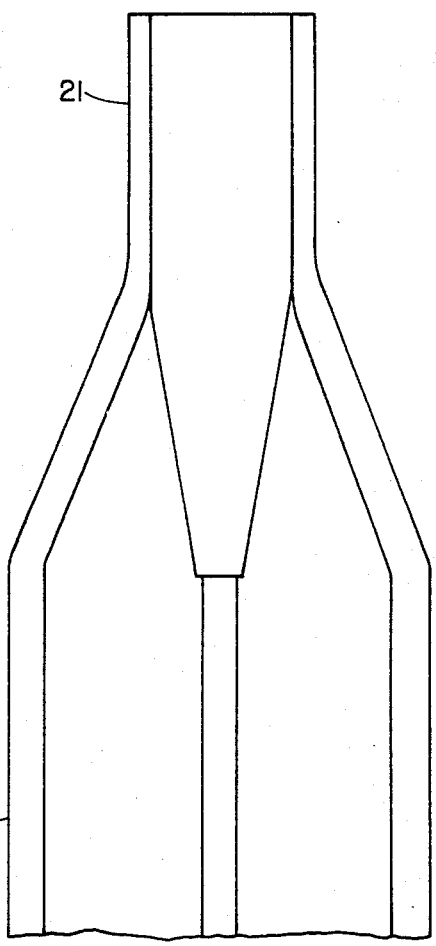

FIGS. 11, 12, as well as FIGS. 13 and 14, illustrate another example of a flow profile 16 produced by drawing of the basic conduit body 12 (FIG. 5). As becomes apparent from FIGS. 11 and 13, the respective central web ends are still spaced apart a certain distance; accordingly, the section 16 still requires some forming, as do those of FIGS. 7 and 9. Prior to final forming and welding or brazing along the web ends, the flow profiles, in the embodiments of FIGS. 11 to 14, are still provided with a circular connecting portion 21 which is produced by circular swaging to suitably connect the respective flow profiles with the base of a heat exchanger. This connecting portion can, of course, be also produced through other suitable methods (drawing, pressing or rolling), where it can be made polygonal, and wherein the term "polygonal" embraces the terms square, rectangular, trapezoidal, hexagonal or octagonal conduit connecting section.

Figure 15:
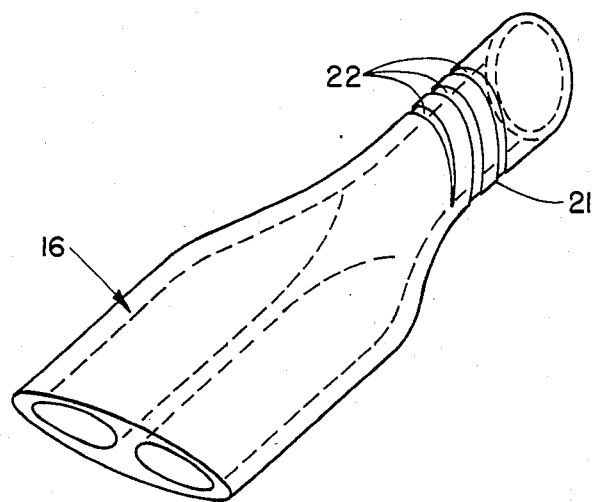
FIG. 15 is a perspective view of the finished flow profile of FIGS. 12 and 14.

The connecting portion 21 can also be provided, as shown in FIG. 15, with grooves 22, with these grooves being incorporated either before or after welding or brazing together the remaining web ends. In accordance with FIG. 15, the grooves 22 can be sequentially equally spaced in the outer circumferential wall of the connecting portion 21, or they may be coined helically in circumferential direction into the connecting portion.

Figure 16:
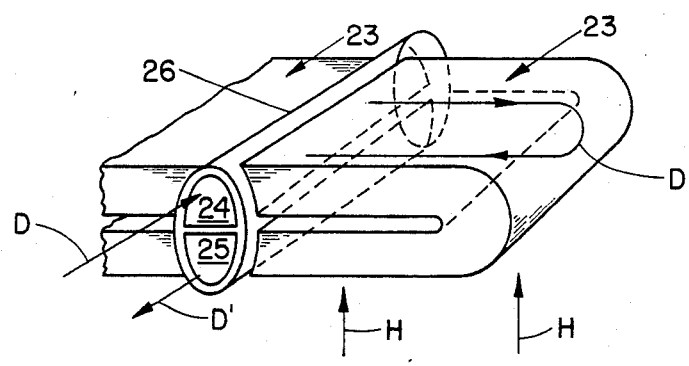
FIG. 16 is a perspective view of the finished flow profile of FIGS. 12 and 14.

FIG. 16 illustrates a heat exchanger which is suitable for use with the inventive flow sections, wherein the respective cross-countercurrent matrix is indicated by the numeral 23 and wherein the hollow profiled sections, in effect sections 16 of FIGS. 8 and 10 which form the matrix are connected on the one hand, to a first stationary pipe duct 24 so as to feed compressed air D into the matrix, and wherein the hollow sections are connected, on the other hand, to a second stationary pipe duct 25 from which the compressed air D', having been heated through the matrix by hot gas (arrowhead H), is conveyed to a suitable consumer, such as the combustion chamber of a gas turbine engine. In accordance with FIG. 16, the two separate pipe ducts 24 and 25 are integrated into a common manifold 26, with the heat exchanger matrix 23 projecting laterally from the manifold 26 in a U-shape. The respective route of the compressed air through the matrix 23 is indicated by the arrow D. The common manifold for the two pipe ducts 24 and 25 can, conceivably, be assumed by a heat exchanger configuration which incorporates two separately arranged, essentially parallel pipes, of which one carries the compressed air into the matrix and of which the other conducts the compressed air out of the matrix and towards a suitable consumer.

Figure 17:
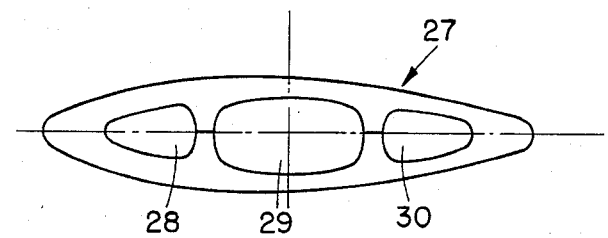
FIGS. 17, 18, 19 and 20 show a turbine nozzle vane section in order of its final forming, with a twist imparted thereto in the final condition of FIG. 20, and as derived from the basic profile produced in accordance with the process of the present invention and as shown in FIG. 17.
Figure 18:
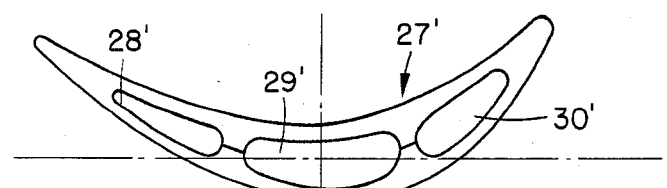
Figure 19:
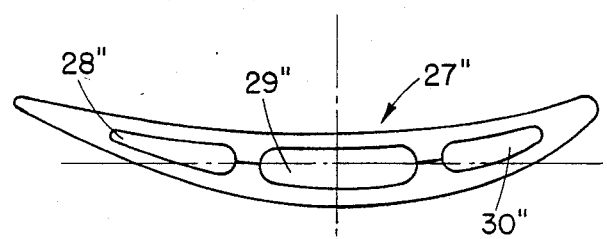
Figure 20:
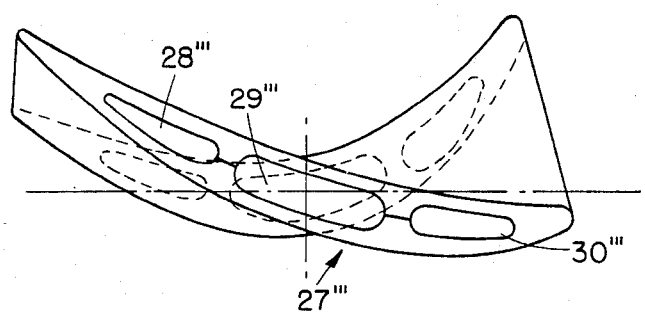

FIG. 17 illustrates a basic flow profile 27 manufactured from a polygonal conduit having separate internal passageways 28, 29 and 30. For example, assuming the basic flow section of FIG. 17 to be intended for turbine nozzle vane or rotor blade applications, the procedure in accordance with the present invention would be to cut the basic section 27 of FIG. 17 to its proper length and then to impart it the intended optimum shape to conform to aerodynamic and thermodynamic requirements. In accordance with FIG. 18, the respective section 27' is then essentially curved and, in accordance with the contour 27" of FIG. 19, drawn predominantly along the longitudinal direction for final shaping after which, in accordance with FIG. 20 and contour 27'" the blade is imparted the intended amount of twist, conceivably by way of a forging process in which the respective airfoil of FIG. 19 is hammered into final shape through suitably formed dies, as shown in FIG. 20.

For exemplary application of the flow profiles produced in accordance with the present invention to the known heat exchangers, it is not always necessary to form circular connecting portions on the flow profiles; instead, the lancet-shaped flow profiles may possibly be made to open directly into the base portions of the heat exchanger, and can be attached at these points.

What is claimed is:

1. A method for manufacturing hollow heat exchanger matrix flow profiles of aerodynamic configurations, said profiles each having an outer skin streamed about during operation by a first working medium, and internal passages in the flow profiles simultaneously streamed through by a second working medium; comprising the steps of forming material accumulations at predetermined locations spaced over the circumference of a conduit of an initially predetermined sectional configuration; deforming said conduit so that one of the material accumulations produces a side thickening of the wall being formed proximate the area of the leading and trailing edges of the flow profile, and further deforming said conduit so that other material accumulations produce inner webs superimposed in the meridian plane ultimately to provide at least two separate compressed air passages, said forming step further including providing two diametrically opposite material accumulations on the circumference of the conduit of the same web-like configuration before the final forming of the profile and a projectile structure on the conduit wall; inserting turbulence-inducing metal means between the adjacent ends of the inner webs of the finish-formed flow profiles, and fastening said turbulence-inducing metal means together with the ends of the inner webs, as an internal structural component of the flow profile; effecting the final finish forming through pressing the inner webs together and welding them together.

2. Method as claimed in claim 1, comprising utilizing an internal tool for forming the final inner contour of the compressed air duct.

3. Method as claimed in claim 1, wherein prior to the intermediate webs of the flow profile being welded together, shaping at least one extreme portion of the profile into a circular or polygonal connecting member; and prior or subsequent to joining together along the remaining web ends, imparting at least said one connection piece with coaxially, helically extending or threaded grooves in the inner or outer wall thereof.

4. A method as claimed in claim 1, wherein said hollow profiled sections for the matrix of a heat exchanger are lancet-shaped; comprising fastening said hollow profiled sections to a first stationary conduit for directing compressed air into the matrix, and to a second stationary conduit in which the compressed air heated during its passage through the matrix is directed to a consumer, and connecting the two separate pipe conduits into a common manifold formed by mutually parallel individual conduits, whereby the heat exchanger matrix formed by the hollow profile sections projects laterally relative to the manifold or relative to the individual conduits in a U-shaped configuration.

* * * * *